United States Patent [19]

Ouchi et al.

[11] 4,083,053

[45] Apr. 4, 1978

[54] INK JET RECORDING METHOD AND APPARATUS

[75] Inventors: Yoshio Ouchi, Mito; Takatoshi Ikeda, Hitachi, both of Japan

[73] Assignee: Hitachi, Ltd., Japan

[21] Appl. No.: 667,468

[22] Filed: Mar. 17, 1976

[30] Foreign Application Priority Data

Mar. 19, 1975 Japan ................................ 50-32354

[51] Int. Cl.$^{2}$ ............................................ G01D 15/18

[52] U.S. Cl. ...................................................... 346/75

[58] Field of Search ..................................... 346/75, 1

[56] References Cited

U.S. PATENT DOCUMENTS

| | | | |
|---|---|---|---|
| 3,298,030 | 1/1967 | Lewis et al. | 346/75 |
| 3,588,906 | 6/1971 | VanBrimer | 346/75 X |
| 3,596,275 | 7/1971 | Sweet | 346/75 X |
| 3,878,517 | 4/1975 | Kasubuchi | 346/75 |
| 3,911,818 | 10/1975 | MacIlvaine | 346/75 X |

*Primary Examiner*—Joseph W. Hartary
*Attorney, Agent, or Firm*—Craig & Antonelli

[57] ABSTRACT

In recording information patterns on the surface of an article conveyed by a conveyer, a distortion of recorded patterns occurs when the speed of the conveyer varies. In the present invention, the speed of the conveyer is detected to control the collection of dot-forming ink droplets thereby preventing the occurrence of the distortion of the recorded patterns.

3 Claims, 11 Drawing Figures

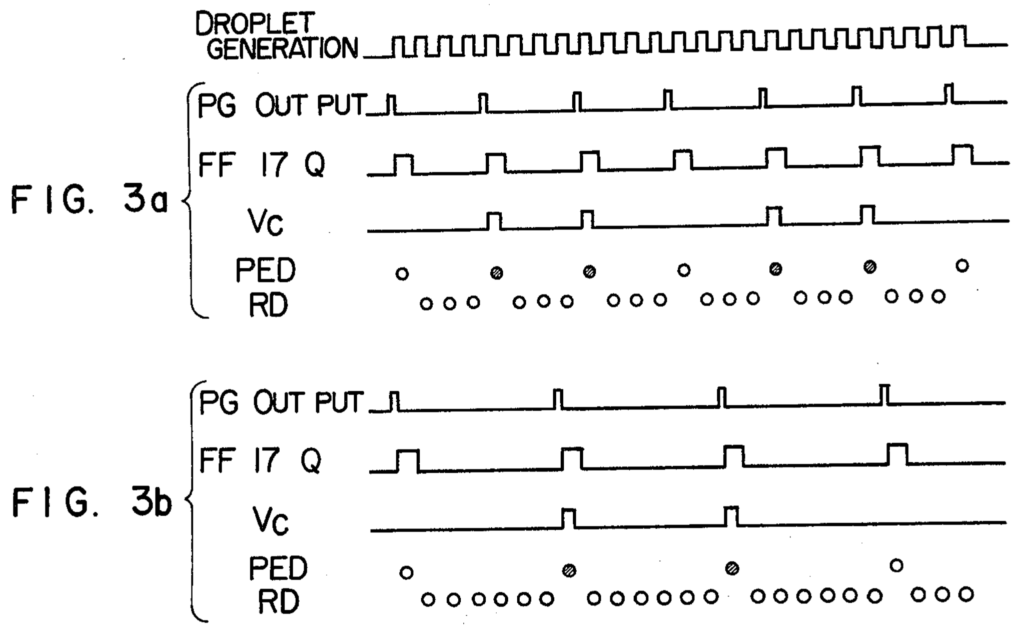
FIG. 4
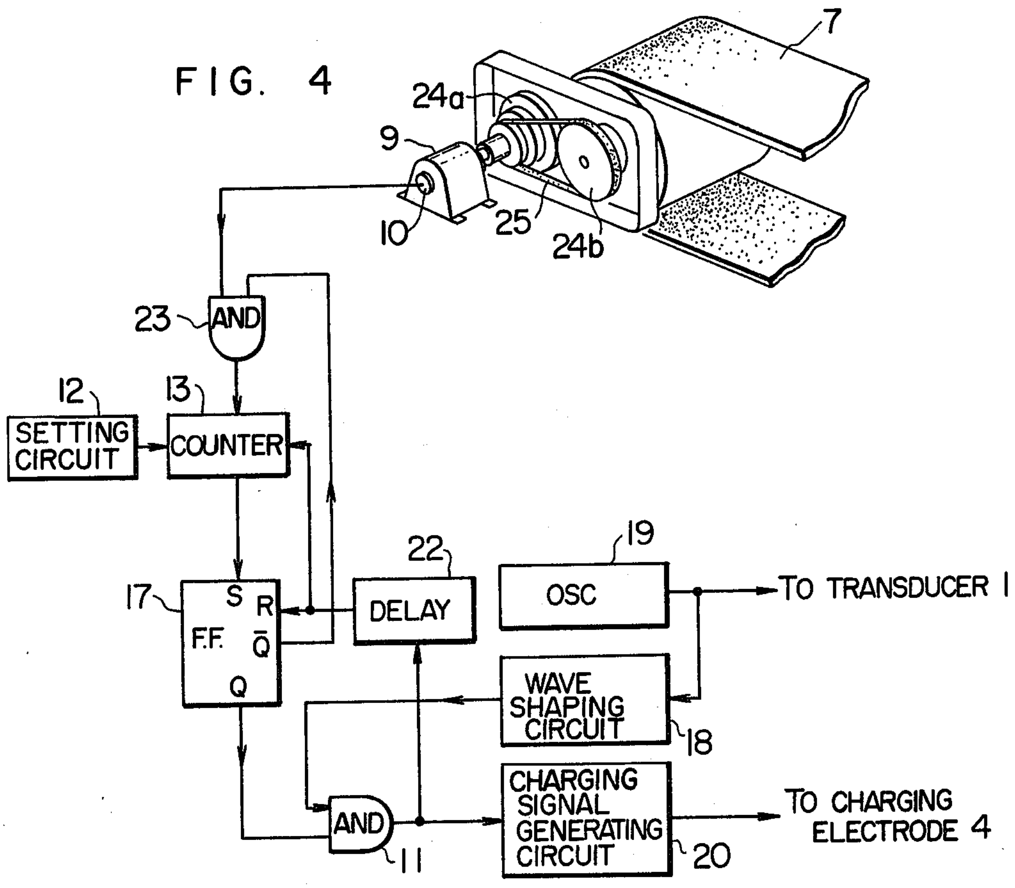

INK JET RECORDING METHOD AND APPARATUS

BACKGROUND OF THE INVENTION

1. Field Of The Invention

The present invention relates to ink jet recording method and apparatus, and more particularly to ink jet recording method and apparatus in which information patterns are formed in the form of dot matrices on a record medium by the movement of the record medium and the deflection of ink droplets.

2. Description Of The Prior Art

When pressurized ink is ejected from a nozzle toward the record medium, the ink ejected from the nozzle is separated into regular droplets as the nozzle is mechanically vibrated. When the ink droplets are electrically charged and then projected in a static field, the droplets are deflected depending on the magnitude of the charges imparted to the respective droplets.

Thus, when the recorded medium is moved in one direction and the ink droplets are repeatedly deflected in a predetermined angle to the direction of the movement of the record medium, which may be a right angle when the deflection speed of the ink droplets is much higher than that of the record medium, dot matrices can be formed on the surface of the record medium. In this case, when the droplets projected straight-forwards are collected before deposition on the record medium and at the same time the amount of charge imparted to the droplets is controlled, information patterns can be formed on the record medium in the form of dot matrices. A great many of such ink jet recording methods and apparatus have been proposed. This type of ink jet recording is advantageous in its high operation speed and its quiet operation, and therefore, has been used for industrial marking. In such a system, the record medium is conveyed by a conveyer, the moving velocity of which varies with production control or power supply control. The variation in the moving velocity of the conveyer results in a variation in the moving velocity of the record medium, and consequently the dot matrices are thrown into disorder, so that a distortion of the recorded patterns occurs. In order to prevent such distortion of the recorded patterns, such methods may be considered wherein the period of formation of the ink droplets is adjusted depending on the moving velocity of the conveyer or the conveyer is operated at a constant speed during recording operation. However, in the former method there is a drawback that the operation of the apparatus is liable to be unstable since it is necessary that the ink pressure and the vibrating frequency are changeable, and in the latter method there is a drawback in that the conveyer apparatus becomes complicated, and hence the entire manufacture becomes expensive.

SUMMARY OF THE INVENTION

It is an object of the present invention to provide an ink jet recording method and apparatus capable of preventing the distortion of recorded patterns even when the moving velocity of the record medium is varied.

It is another object of the present invention to provide ink jet recording method and apparatus capable of stable operation in the presence of variations of the moving velocity of the record medium.

It is still another object of the present invention to provide an ink jet recording method and apparatus which are suitable for application to manufacture using a conveyer system.

In an ink jet recording method according to the present invention, the ink ejected from the nozzle is formed into droplets to which some amount of electric charge is imparted, and then the droplets are deflected under control such that the droplets are selectively deposited on the record medium which is moved in a predetermined angle to the direction in which the droplets are deflected, thereby recording information patterns in the form of dot matrices are formed on the surface of the record medium. The formation of the ink droplets from the nozzle is effected at a fixed interval and the proportion of the collected ink droplets to the deflected ink droplets is changed depending on the moving speed of the record medium in accordance with this invention.

The foregoing and other objects, features and advantages of the present invention will become more apparent from the following detailed description of the invention when taken in conjunction with the accompanying drawings.

BRIEF DESCRIPTION OF THE DRAWINGS

FIGS. 3*a* and 3*b* show operation waveforms.

FIG. 4 is a block diagram of another embodiment.

DETAILED DESCRIPTION OF THE PREFERRED EMBODIMENTS

Figure 1A:
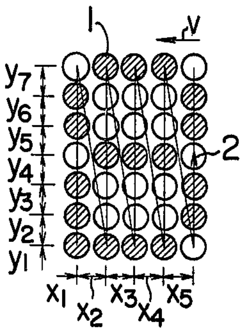
FIG. 1*a* shows an example of an information pattern recorded in the form of dot matrices.
Figure 1B:
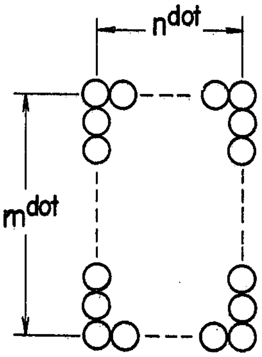
FIG. 1*b* shows a typical example of a dot matrix.

FIG. 1*a* shows an example of a recorded figure "8" a 5 × 7 dot matrix. In the form of designations $y_1$ through $y_7$ represent deflection pitches for record dots 1, and designations $x_1$ through $x_5$ represent the spacing between scan traces 2 or scan line pitch. The deflection pitch $y$ is determined by the period of formation of the ink droplets and the amount of deflection while the scan line pitch $x$ is determined by the amount of movement of the record medium. The system is preferably designed such that, at the transition from a first deflection run to a second deflection run, the recorded dots deposited on the record surface by the second deflection run slightly overlap the recorded dots deposited on the record surface by the first deflection run. Too much overlapping must be avoided. Where $x$ represents the scan line pitch under a normal recording condition of information patterns and $v$ represents the moving speed of the record medium under such condition, in order to maintain the scan line pitch $x$ when the moving velocity is changed to $v'$ ($v' < v$), a waiting time of $$\Delta t = \frac{x - x'}{v'} \qquad (1)$$

is required before the second deflection run is started after the termination of the first deflection run.

Where the frequency of formation of the ink droplets is $f$ and the dot matrix is of $m \times n$ as shown in FIG. 1*b*, the equation (1) may be written as $$\Delta t = \frac{m \cdot v}{f} \left( \frac{1}{v'} - \frac{1}{v} \right) \quad (2)$$

When the moving velocity of the record medium is measured by a pulse generator linked to a drive mechanism and a rotor of the pulse generator produces N signals per one revolution thereof, the period $\tau$ of the pulse signals generated by the pulse generator at the velocity of $v$ is given by $$\tau = \frac{K}{v \cdot N} \quad (3)$$

where $K$ is a constant. When the output pulses from the pulse generator are counted to detect the velocity, the extended count time $\Delta t'$ due to the decrease of the velocity (pulse period of $\tau'$) is given by $$\Delta t' = M(\tau' - \tau) = \frac{M \cdot K}{N} \left( \frac{1}{v'} - \frac{1}{v} \right) \quad (4)$$

where $M$ is a setting of the counter. In order to maintain normal scan line pitch $x$ between the first deflection run and the second deflection run, the following relation should be met:

$$\frac{m}{f} v = \frac{M \cdot K}{N} \quad (5)$$

When this is met, the next scan waiting time due to the decrease of the velocity and the increase of the count time due to the extension of the pulse period of the pulses generated from the pulse generator are equal and the scan line pitch can be maintained constant.

When the inclination of the information pattern is also to be corrected, $m$ is put to one ($m = 1$) and the following equation which is derived in the same manner as the equation (5) is used;

$$\frac{v}{f} = \frac{M \cdot K}{N} \quad (6)$$

where $M' < M$. If the pulse generator is selected such that the constant K' and N' satisfy the relation $$\frac{M' \cdot K}{N} = \frac{K'}{N'},$$

then the counter may be omitted. The frequency of the formation of dots by the deposition of the ink droplets on the record surface, or the dot frequency is given by;

$$fv = \frac{1}{t} = \frac{1}{M} = \frac{N}{M \cdot K} v \quad (7)$$

where $fv$ is the dot frequency at the velocity $v$, and $t$ is the time required for counting of M output pulses from the pulse generator. When the velocity changes to $v'$, the above time is the sum of $t$ plus $\Delta t'$ given by the equation (4). Thus, $$fv' = \frac{1}{t + \Delta'} = \quad (8)$$

-continued $$\frac{1}{\frac{M \cdot K}{v \cdot N} + \frac{M \cdot K}{N} \left( \frac{1}{v'} - \frac{1}{v} \right)} = \frac{N}{M \cdot K} v'$$

Since $v' < v$, the dot frequency decreases.

Figure 2:
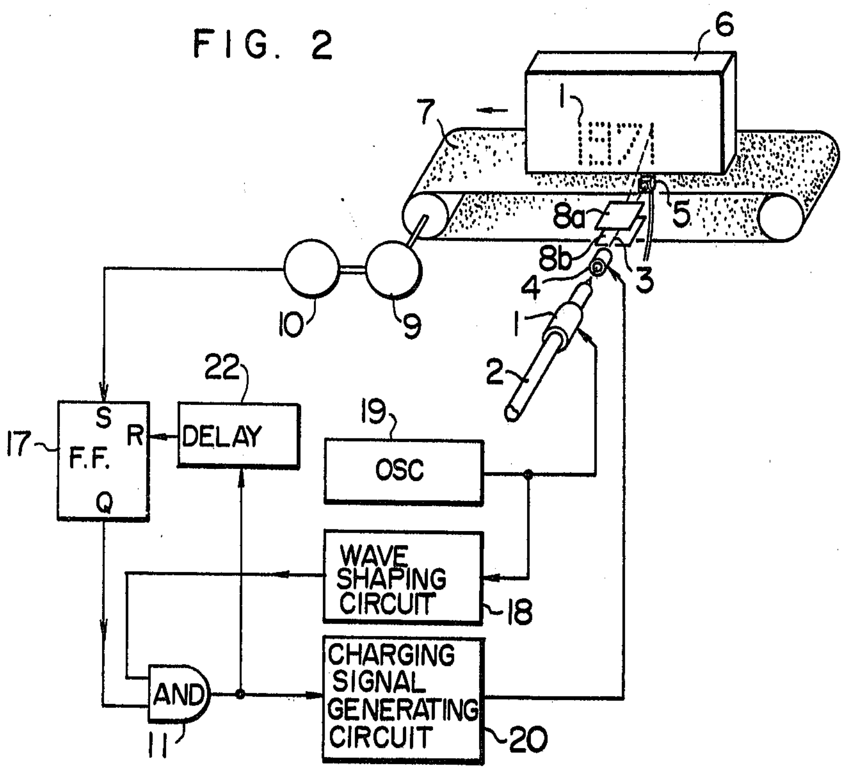
FIG. 2 is a block diagram of an ink jet recording apparatus in accordance with the present invention.

Referring to FIG. 2, an ink jet recording apparatus capable of preventing the distortion of recorded patterns based on the above technical concept is explained. Attached to an ink ejection nozzle 2 is a piezoelectric vibrator 1. The ink ejected from an end of the nozzle is of cylindrical shape, which is the separated into droplets 3 and those droplets which pass straightforwards between deflection electrodes 8a and 8b are collected by a gutter 5, but the deflected droplets bypass the gutter 5 and impinge into a record medium 6 to form a dot matrix thereon. A conveyer belt 7 is driven by a motor 9 in the direction of the arrow. A pulse generator 10 is mechanically coupled to the motor 9 to generate pulse signals of a period corresponding to the rotation speed of the motor 9 and hence the moving velocity of the record medium 6. A flip-flop circuit 17 is provided, which has a set terminal S, a reset terminal R and an output terminal Q. The output pulse signals of the pulse generator 10 set the flip-flop circuit 17 to cause the output terminal Q to be a high level. One input terminal of an AND gate 11 is connected to the output terminal Q of the flip-flop 17. An output signal of a reference frequency oscillator 19 comprising a sinusoidal wave generating circuit is supplied to the piezoelectric vibrator 1 and also to a wave shaping circuit 18. An output signal from the wave shaping circuit 18 is applied to the other input terminal of the AND gate 11 so that an instruction signal is applied to a charging signal generating circuit 20 when the output terminal Q of the flip-flop 17 is at high level. When the instruction signal is applied, the charging signal generating circuit 20 generates a charging voltage corresponding to an information pattern to apply the voltage to a charging electrode 4. A delay circuit 22 functions to reset the flip-flop 17 after the charging signal has been generated in response to the instruction signal.

The ink jet recording apparatus thus constructed operates in a manner shown in FIG. 3*a* under a high operation speed mode and in a manner as shown in FIG. 3*b* under a low operation speed mode.

In FIGS. 3*a* and 3*b*, the periods of the formation of the ink droplets are common and fixed. On the other hand, the output of the pulse generator 10 (PG output) has a shorter period under the high operation speed mode. In FIG. 3*a*, whenever the PG output is up, the output of the flip-flop 17 (FF 17 Q) becomes high level and the output of the wave shaping circuit 18 is gated by the AND gate 11 to the charging signal generating circuit 20 to apply the instruction signal thereto. Depending on the presence or absence of the dot, a charging signal voltage $V_c$ corresponding to the magnitude of the deflection required is generated from the charging signal generating circuit 20. The ink droplets corresponding to picture elements are represented by PED and the other ink droplets are represented by RD. The ink droplets charged are hatched in the figures and all other ink droplets are collected. In FIG. 3*b*, the proportion of the ink droplets RD which do not correspond to the picture elements increases. It will be understood that the proportion of the ink droplets PED corresponding to the picture elements decreases as the moving velocity of the record medium 6 decreases.

The embodiment of FIG. 4 shows the case where the velocity of the conveyer belt 7 can be changed stepwise by pulleys 24*a* and 24*b* and a belt 25, and the output pulses of the pulse generator 10 are divided by a counter 13 which produces a high level output signal when the number of imput pulses reaches a predetermined value. The divided output from the counter 13 is applied to the flip-flop 17. An AND gate 23 is inserted between the pulse generator 10 and the flip-flop 13 and the division rate by the counter 13 is determined by a setting circuit 12 depending on the velocity of the belt 7 in accordance with the relations between *v* and *f* given by the equation (6). Applied to the other input of the AND gate 23 is an output $\overline{Q}$ of the flip-flop 17 (which assumes high level at reset state).

With the above construction, even when a drive ratio of the motor 9 to the conveyer belt 7 changes, the change can be compensated for by the counter 13 to attain a similar compensation as in the case of FIG. 2.

Figure 7A:
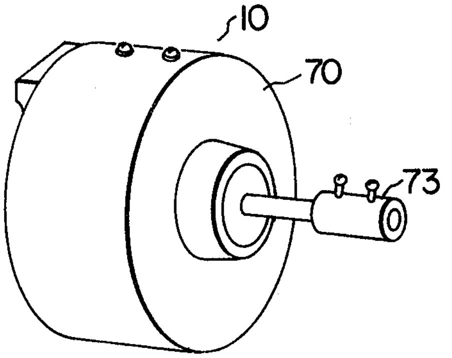
FIGS. 7*a* through 7*c* show an external view of a pulse generator, an internal perspective view thereof, and a longitudinal sectional view of a photoelectric transducer, respectively.
Figure 7B:
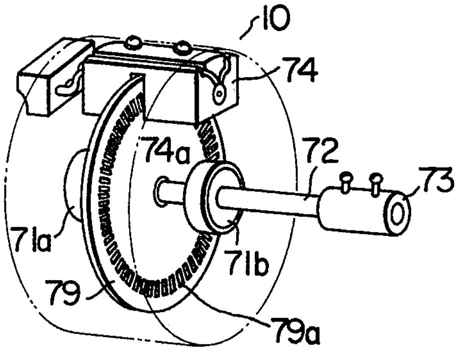
Figure 7C:
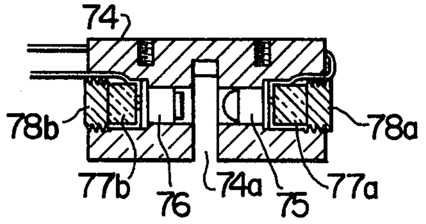

A construction of the pulse generator 10 used to control the recording apparatus described above is now explained with reference to FIGS. 7*a* to 7*c*. In the figures, a housing 70 supports a rotor shaft 72 by bearings 71*a* and 7/*b*. A coupling 73 couples the rotor shaft 72 to the motor 9. A holder 74 has a radially extending cutout 74*a* on both sides of which a light emitting element 75 and a light sensing element 76 are provided. A photodiode may be used as the light emitting element 75 and a photo-transistor may be used as the light sensing element 76. Both elements are mounted on the holder 72 by means of cushions 77*a*, 77*b* and screws 78*a* and 78*b*. A disk 79 is attached to the rotor shaft 72, which disk has slits 79*a* formed at its outer periphery. The slits 79*a* pass between the elements 75 and 76 to cause the phototransistor 76 to generate pulse signals.

Figure 5:
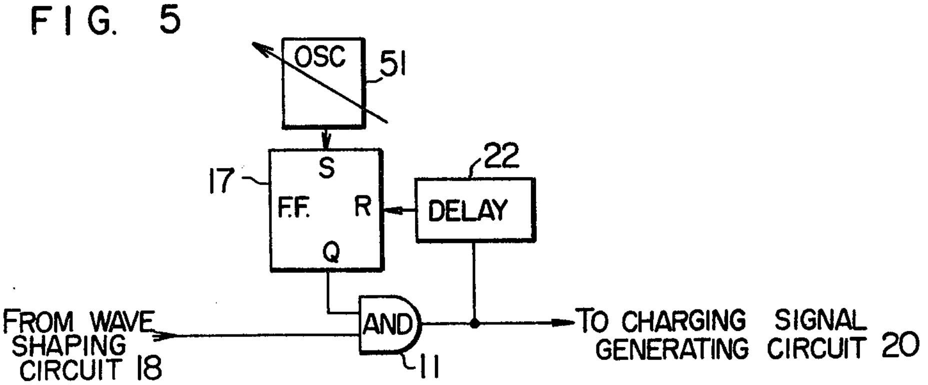
FIG. 5 is a block diagram of an ink droplet collection control circuit.

In FIG. 5, a variable frequency oscillator 51 is provided instead of the pulse generator 10. In this case, the oscillator 51 is arranged to generate an output of frequencies corresponding to the rotation speed of the motor 9. The remaining construction is the same as that of FIG. 2 and hence the detailed explanation thereof is omitted.

Figure 6:
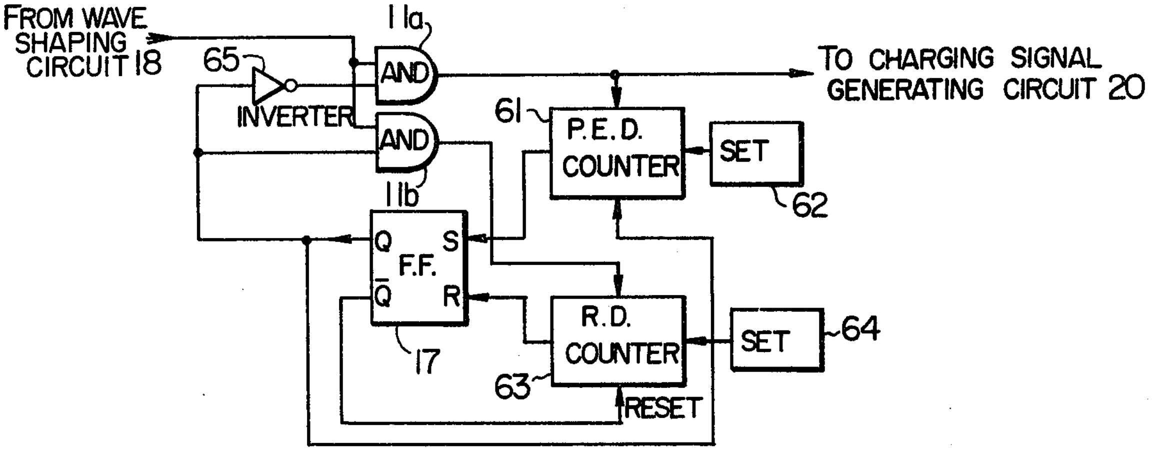
FIG. 6 is a block diagram of another example of the ink droplet collection control circuit.

FIG. 6 shows an arrangement which allows control after collection rate of the ink droplets generated between the first scan run and the second scan run for controlling the overlap of the dots on the first scan line and the dots on the second scan line. In the present example, an output of the oscillator 19 is applied through a wave shaping circuit 18 to first input terminals of AND gates 11*a* and 11*b*. An output from the AND gate 11*a* is used as an instruction signal to the charge signal generating circuit 20 and counted by a counter 61. The counter 61 counts the number of dots per one scan line (seven dots in the example of FIG. 1a). This number is set by a setting circuit 62, and when the number of inuput pulses reaches the present number, the counter 61 produces a high level output to set the flip-flop 17. Another counter 63 counts the number of droplets to be collected between the last dot of the scan line and the first dot of the next scan line. The counter 63 is preset by a setting circuit 64 and it counts the pulses from the AND gate 11b. The output of the counter 63 is used to reset the flip-flop 17. The setting circuit 64 changes its preset value depending on the moving velocity of the record medium such that it is present to a small value during high speed operation and to a large value during low speed operation. When reset, the flip-flop 17 produces a high level output at the output terminal $\overline{Q}$, which output resets the counter 63.

The above circuit operates in the following manner to maintain the scan line pitch at a constant value. The flip-flop 17 is initially in its reset state and the AND gate 11a is opened while the AND gate 11b is closed. Accordingly, the output from the oscillator 19 after having been wave-shaped is applied to the charging signal generating circuit 20 as an instruction signal. Whenever an ink droplet is formed, it is charged depending on an information signal. Assuming that the number of picture elements per one scan line is seven, the ccounter 61 is preset to seven and after that, the flip-flop 17 is set and the AND gate 11*a* is closed while the AND gate 11*b* is opened. Therefore, no instruction signal appears thereafter. For the above period, the output of the oscillator 19 is applied through the wave shaping circuit 18 and the AND gate 11*b* to the counter 63 for count. The count in this period is effected to adjust the scan line pitch. When the moving velocity of the record medium 6 is fast, the counter 62 is preset to a small value and when the preset count is reached, the counter 63 produces an output to reset the flip-flop 17. The counter 61 is thereby reset and the AND gate 11*a* is opened while the AND gate 11*b* is closed, and the ink droplets on the next scan line are charged. Accordingly, by manually or automatically adjusting the preset value of the setting circuit 64 depending on the moving velocity of the record medium 6 for controlling the preset value of the counter 63, the scan line can be always maintained at a constant value.

As described hereinabove, according to the present invention, since the period of formation of the ink droplets ejected from the nozzle can be maintained constant, a stable compensation of the distortion due to the change in moving velocity of the record medium is attained.

We claim:

1. An ink jet recording apparatus comprising: conveyer means for conveying a record medium; a nozzle for ejecting ink droplets substantially perpendicular to a record surface of the record medium; a transducer for mechanically vibrating said nozzle a charging electrode for imparting electric charges to the ink droplets; a deflection electrode for deflecting the ink droplets in a predetermined angle to the direction of movement of the record medium depending on the amount of electric charges imparted to the ink droplets; an oscillator for applying a drive voltage to said transducer; and a charging signal generating circuit for generating a charging voltage to be applied to said charging electrode in synchronism with the output of said oscillator;

a first counter for counting the number of pulse signals applied from said generator to said charging signal generating circuit; a first setting circuit for presetting and first counter to the number of picture elements per scanning line; a second counter for counting the number of pulse signals from said oscillator; a second setting circuit for presetting said second counter to a value corresponding to the moving velocity of the record medium; a gate circuit for blocking the pulse signals to said charging signal generating circuit and gating the pulse signals to said second counter when said first counter reaches its preset value; and a gate circuit for blocking the pulse signals to said second counter and gating the pulse signals to said charging signal generating circuit when said second counter reaches its preset value.

2. An ink jet recording method including the steps of generating ink droplets continuously at constant intervals, deflecting said ink droplets in a direction, moving a record medium in a right angle to said direction thereby forming a picture on the record medium in the form of dot matrices, wherein said method further comprises the steps of: establishing ink droplets which do not correspond to picture elements, between an ink droplet corresponding to a last picture element on a scanning line and an ink droplet corresponding to a first picture element on a following scanning line; and changing the number of said ink droplets which do not correspond to the picture elements depending on the moving velocity of said record medium.

3. An ink jet recording method according to claim 2, wherein said step of changing the number of ink droplets which do not correspond to picture elements comprises the steps of: generating a pulse signal for each predetermined amount of movement of the record medium; and in response to said pulse signal, generating a charging voltage corresponding to the amount of electric charges to be imparted to the ink droplets thereby charging the ink droplets.

* * * * *